May 1, 1951  B. R. GOSSICK  2,550,688
METAL DETECTION APPARATUS
Filed March 19, 1949
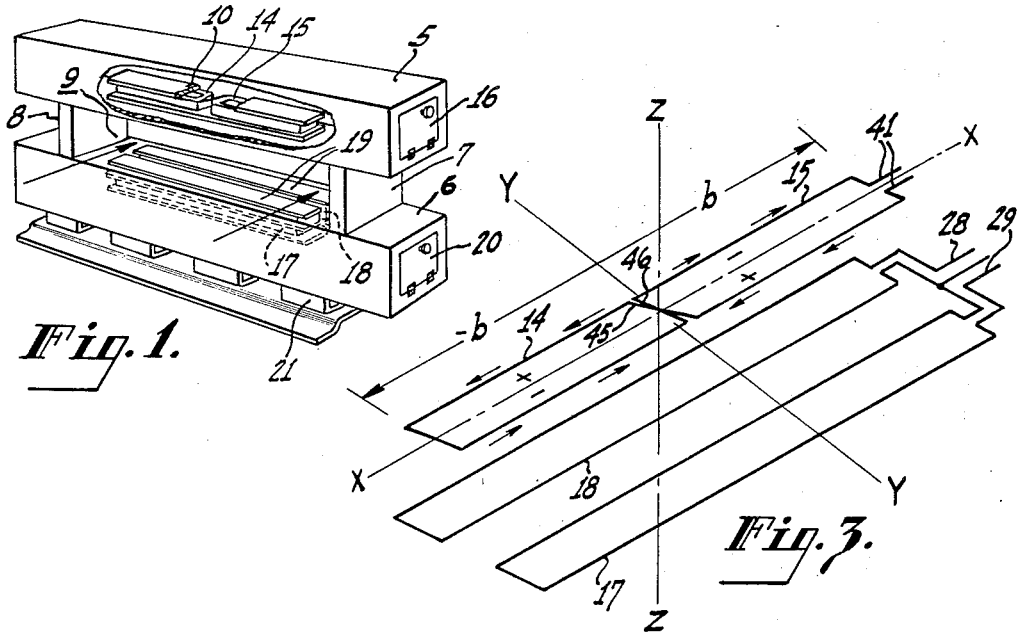
Fig. 1.
Fig. 3.
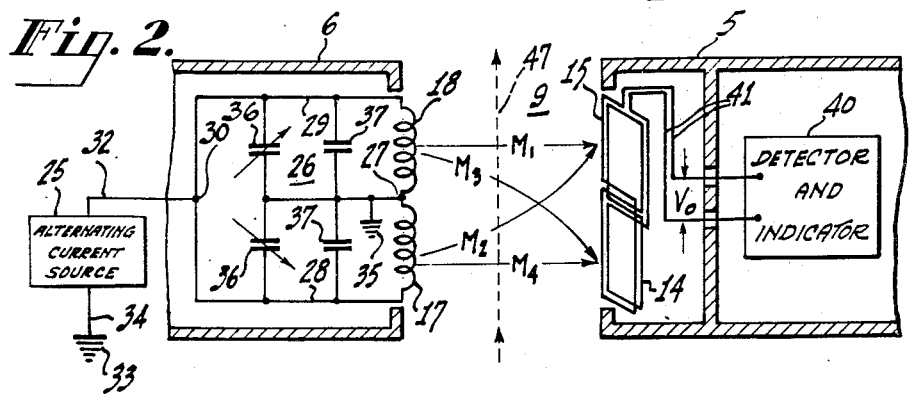
Fig. 2.
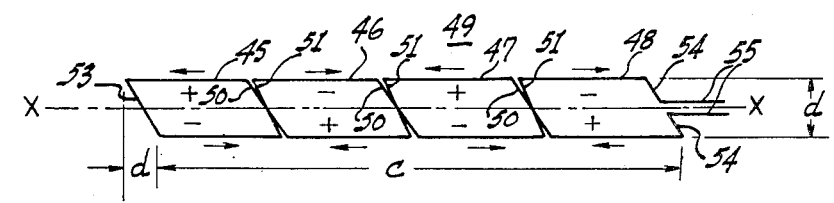
Fig. 4.
INVENTOR
BEN R. GOSSICK
BY
ATTORNEY Patented May 1, 1951

2,550,688

UNITED STATES PATENT OFFICE 2,550,688

METAL DETECTION APPARATUS

Ben R. Gossick, Oak Ridge, Tenn., assignor to Radio Corporation of America, a corporation of Delaware Application March 19, 1949, Serial No. 82,445

13 Claims. (Cl. 175—183)

The present invention relates to metal detection apparatus of the type having an inspection or metal detecting aperture between spaced inductor elements of a normally balanced inductive coupling system responsive to and arranged to provide an indication of the presence of metal in the aperture. Apparatus of the type referred to, for example, is shown, described and claimed in a copending application of J. H. Reynolds, for Metal Detectors, Serial No. 568,045, filed December 13, 1944, now Patent No. 2,513,745, issued July 4, 1950, and assigned to the same assignee as the present application.

In an inspection apparatus of the character referred to, for the continuous detection of metal contamination in non-conducting materials, and for which the present invention is particularly adapted, moving conveyor means serves to carry the materials between an oscillator unit and a detector unit arranged in spaced relation to provide an inspection zone or aperture in which an alternating electromagnetic field is established and inductively linked with a pick-up inductor arrangement in a detector circuit.

The general principle of operation of apparatus of this type involves the establishment in the detector circuit of induced alternating voltages which are normally of equal amplitude and opposite phase. This may be accomplished, for example, by applying alternating currents to a pair of primary coils in symmetrical inductive coupling relation, across an inspection area, with a secondary coil from which normally substantially zero output voltage is derived. The two magnetic fields established by the primary coils are of opposite sign or polarity, and the secondary coil is adjusted in position for an initial balance to produce a null or substantially zero voltage output therefrom in response to alternating current applied to the primary coils.

Material to be inspected is passed through the inspection aperture, between the primary and secondary coils, by any convenient conveyor means. Any included metal contamination brought into the field between the coils causes distortion thereof, because of the magnetic permeability of the metal, or, if non-magnetic, because of the magnetic field produced by currents induced therein. Therefore, the initial balanced condition, which is very critical, will be upset by any metal object which appears in the field of the apparatus, even at a considerable distance therefrom, and the resulting voltage output is utilized to actuate suitable detecting and/or indicating means.

The sensitivity of a metal detector or like inspection apparatus to small disturbances of the magnetic field depends primarily upon the perfection of the initial balance in the energy transfer between the coils, and the maintenance of high sensitivity under conditions of vibration and changes in temperature, normally encountered, requires a high degree of stability.

In order that the initial balance may remain constant and critical, and highly responsive to relatively small particles or objects, having electrical properties of permeability or conductivity, that may pass through the inspection aperture, even at a considerable distance from the coils forming the balanced energy transfer arrangement, the improved coil system of the present invention has been provided, and meets the problem of attaining a satisfactory and stabilized null or initial zero voltage output in the presence of disturbing influences which ordinarily may introduce into the secondary winding or detector inductance an appreciable residual voltage at all times, as a limitation on the sensitivity.

As a practical matter, to preserve the critical balance, it is necessary to place the coils in shielding containers to limit the coupling field to the inspection aperture or space immediately between the coils, and to provide rigid mounting means for the coil system.

Because of the presence of the shielding means and supporting elements, it is often extremely difficult to obtain an exact balance or null in the output, thereby impairing the relative sensitivity of the apparatus to minute impurities, for which the apparatus must often be adapted in industry. The more exact the balance, and the stronger the field, the more sensitive the apparatus is to metal contamination in materials being inspected.

It is a primary object of this invention, to provide an improved metal detection apparatus having an inspection aperture which is sensitive to extremely minute metal impurities in non-conducting materials introduced therein, through a more effective balance of the coil system thereof.

A further and important object of the said invention is to provide an improved construction for balanced inductor metal detectors and the like, which effectively reduces the effect of dimensional tolerance variations in construction, vibration, and temperature drift on the null or residual signal output thereof, and which also reduces to a minimum any signal component produced by any inherent electrical properties of the material under inspection.

It is a further object of the said invention, to provide an improved inductor system for metal detection apparatus and the like, whereby a more effective balance and minimum error voltage output may be attained without attendant complications in adjustment and operation.

It is also an object of the invention, to provide an improved inductance arrangement or coil system, adapted for operation in relatively strong magnetic fields, in conjunction with the inspection aperture of a metal detector apparatus, and which provides for balancing out undesired residual voltages of random phase angle, whereby a maximum operating sensitivity may be realized without resorting to complicated balancing means, and which permits a normal null adjustment of the coils to be effected by proper relative orientation.

In inspection apparatus of the character referred to, the width of the inspection aperture is generally much greater than the height or depth thereof, the latter dimension being measured in the direction of travel of the material through the aperture. It is desirable that the electromagnetic field be uniformly distributed over the full width of the aperture wherein the material to be inspected may pass. The signal pick-up inductor elements of such a system are therefore relatively long and may be subject to spurious signals induced by stray fields from external sources, and to disturbances from the material being inspected, regardless of the presence of any metallic contamination.

It is, therefore, a still further object of this invention to provide an improved metal detector system having a balanced electromagnetic inspection aperture and associated inductor arrangement which is substantially unaffected by the presence of inspection material passed through the aperture or inspection zone and by stray electromagnetic fields from external sources.

In metal detection apparatus of the type having an inspection aperture for continuous inspection of metallic contamination in electrically non-conducting and/or semi-conducting materials such as foods, textiles, tobacco products, plastics and the like, there are generally provided a pair of elongated primary inductors or coils, extending in substantially parallel relation across the width of the aperture and connected with a source of high frequency or other suitable alternating current, such as provided by an oscillator or an R.-F. generator contained in the oscillator head or unit, either above or below the aperture. The coil connections are such that two corresponding elongated electromagnetic fields, in parallel relation, extending along the width of the aperture, are in opposition.

The detector or secondary inductor or coil arrangement likewise extends across the width of the aperture in opposed spaced relation to the field establishing inductors, and is so adjusted along the depth of the aperture, that is, in the direction of travel of the material, that it equally links the opposing flux from the generating or primary coil system, thereby being adjusted for balanced or null output.

For reasons hereinbefore pointed out, it is difficult to obtain an exact balance and to provide a substantially zero voltage output from the detector element in the absence of metallic impurities, because of the presence of the material in the aperture and the dissymmetries of surrounding supporting elements, and because of spurious fields from external sources.

For the inspection of certain materials, a highly sensitive detector apparatus having a relatively strong field of relatively small size is desired. This type of inspection apparatus has heretofore been subject to inherent instability associated with a high gain system.

It is, therefore, a still further object of this invention to provide an improved electromagnetic inspection apparatus of the type referred to, wherein the inductor or coil system provides an improved electrical balance in the presence of a strong electromagnetic field, and in which the aperture may be reduced to a relatively small size without disturbing the stability of operation. In particular, it is contemplated that the height of the aperture may be reduced to concentrate the field.

To this end, and in accordance with the invention, the detector coil system is arranged in a plurality of sections along the transverse axis or width of the aperture, as distinguished from the longitudinal spacing of the generating coils in depth, and the sections are connected in series. This arrangement may be termed a cascade inductor or coil system, providing substantially a cascade bridge which may more effectively be balanced for zero output or null in the detection output, in the absence of contamination materials. The inductors of at least one unit comprising the inductive coupling system are transposed at least once from one side to the other of a center line or axis along the length of the said inductors, and extending laterally across the aperture, that is, at a right angle to the movement of the material through the aperture and to the progressive spacing in depth of the generating coils.

The transposition of the inductors across the transverse center line provides a series of coil sections which may be of equal length and of any suitable number above two and below a certain maximum. Assuming a two-section detector inductance arrangement, the error voltage may be considered to comprise the sum of two voltages, one being induced in one section of the winding and the other being induced in the other section thereof, and as the two sections are connected in opposition, the error voltage output becomes the difference rather than the sum of the two errors.

Thus the errors which are common to both sections of the inductors are cancelled, and this not only applies to errors in symmetry and errors in field components caused by non-uniformity in the magnetizing coil system, but also applies to the error signals produced by homogeneous substances being inspected for the presence of metallic contamination.

It is further arranged that the coil sections are located in overlapping relation to each other in the direction of flow of the material. To this end the cross-over points or transposition connections are made at an angle to the axis of the coil other than 90 degrees. In order to provide a balanced inductive effect of the conductors on opposite sides of the center line of the coil, the end conductors are likewise sloped at the same angle as the cross-over points so that the lengths of the outer conductors of all of the sections of the secondary or detector coil are the same.

The coil sections therefore provide a series of parallelograms in close relation to each other along a common center line. If a voltage induced around a coil section area is assigned an arbitrary polarity sign at any instant, the voltage induced in an adjacent area along the center line will have an opposite sign because the winding is in the opposite direction. The voltage induced in an adjacent area across the center line will also have the opposite sign because this area will be closer to the second primary coil and its net voltage will be determined primarily by the field of the second primary coil. It will be seen that the coil sections assume a parallelogram form in overlapping relation to each other.

With further multiplication of the coil sections, the balance in output may be obtained more easily and will tend to remain in adjustment. In any case, the error voltage output of a multiple-section cascade coil arrangement is the difference between the error voltages induced in the various sections, which must be an even number. At present, a four-section inductor arrangement is preferred, the error voltage being reduced to to a minimum by effectively converting a two-section cascade coil arrangement into a four-section arrangement, wherein adjacent coils are wound in opposition by progressive transposition at definite intervals, and serially connected to the detecting equipment, all of the coils being along a common axis extending transversely of the aperture and lying in a plane having a uniform spacing from the generating coil arrangement.

The novel features as above that are characteristic of this invention, are further set forth with particularity in the appended claims. The invention itself, however, both as to its organization and method of operation, as well as additional objects and advantages thereof, will further be understood from the following description, when read in connection with the accompanying drawings, in which:

Figure 1 is a view in perspective, on a greatly reduced scale and partly broken away, of a metal detector or inspection apparatus embodying the invention;

Figure 2 is a schematic circuit diagram of the apparatus of Figure 1, illustrating a principle of operation of the invention;

Figure 3 is a diagrammatic representation of the coil or inductor system, also arranged in perspective, showing the three major axes thereof in accordance with the invention; and Figure 4 is a schematic diagram showing the configuration and arrangement of one of the inductor elements of the apparatus of Figures 1, 2 and 3, modified in accordance with the invention.

Referring to Figure 1, the metal detector of the present invention is shown as comprising two elongated, superposed inspection heads or containers 5 and 6, preferably of metal or other conducting and shielding material, rigidly spaced apart by insulating spacing blocks 7 and 8, to form an inspection aperture 9 defined at its sides by the blocks 7 and 8 and at the top and bottom by the lower and upper faces, respectively, of the inspection heads 5 and 6.

Material may be passed through the aperture in the direction of the arrows, or in the reverse direction, along the longitudinal axis of the aperture. The height of the aperture is determined by the spacing of the containers or inspection heads 5, 6 and the width is determined by the distance between the blocks 7, 8.

The electromagnetic field for inspection purposes is established within the aperture by suitable inductor means located in one of the heads, while the balanced output or detector inductor means is located in the other inspection head. In the present example, the detector inductance or coil arrangement is mounted in the upper container 5 on insulating form 10, and comprises two equal winding sections 14 and 15. The shielding compartment provided by the container 5 also includes associated detector apparatus (not shown) adapted to be adjusted and controlled through a door 16 at one end of the compartment.

The coil comprising sections 14 and 15 is rigidly mounted on the form 10, opposite an opening in the lower face of the container or inspection head 5, substantially centrally of the inspection aperture and extending laterally over a major portion of the width of the aperture, as shown.

The balanced electromagnetic field in the aperture 9, which links with the two-element elongated coil 14—15 of the detector, is provided by any suitable electromagnetic coil means, such as the two elongated coils or inductors 17 and 18 mounted in parallel, side-by-side relation to each other on suitable insulating forms 19.

The two coils 17 and 18 extend transversely, substantially from side to side, of the aperture, in order, when energized with suitable alternating current, to provide, in primary coils, a uniform field throughout the aperture area linking with the detector or secondary coils 14—15, and are connected in opposed relation to provide fields of opposite polarity in the aperture, and linking uniformly with the coil 14—15 to produce substantially a zero output voltage therefrom in the absence of material containing metallic impurities in the aperture.

The oscillator or R.-F. generator supply means for the primary inductors or coils 17—18 may be located in the lower container or head 6, and the controls and adjustments thereof may be made through a door 20 at one end of the container 6, as shown. The entire metal detector, as a unit, is mounted on suitable shock mounting base means indicated at 21, to reduce the transmission to the coil system of disturbing vibrations tending to cause dislocation of the coils and a shifting of the output voltage from a predetermined minimum null adjustment. The material to be tested is passed through the inspection aperture between the two sets of coils 17—18 and 14—15, and may be carried upon any suitable means, such as a conveyor (not shown).

Referring now to Figure 2, the simplified circuit diagram of the apparatus of Figure 1 is shown with the aperture vertical and the detector coil arrangement shifted 90 degrees for greater convenience in considering the circuit, and like elements thereof are designated by the same reference characters as in Figure 1.

The field generating inductors 17—18 are connected with an oscillator or R.-F. generator 25, providing an energizing source of alternating current which may have a frequency of the order of 60 kc. for example. This is connected through the medium of a tuning network 26 with the inductors 17—18 which are parallel connected in opposition. One supply lead 32 from the generator is connected with one terminal 30 of the network while the opposite supply lead 34 is connected with a terminal 27 through chassis or ground as indicated.

The source 25 is connected to ground 33 through a low potential supply lead 34. The ground connection 33 is completed to the center terminal connection 27 for the coils or inductors 17—18, through a similar ground connection 35, as shown. By this arrangement, the inductors 17 and 18 are connected with the alternating current source in balanced relation, in opposition, and an exact balance in the flux of the opposed fields established thereby may be attained by a proper adjustment of the potentiometer contact 31. Tuning capacitors 36 and 37 are provided in the network for tuning the inductances and circuit for better response at the supply or oscillator frequency. Any other suitable means for obtaining a balanced field distribution from the two coils or inductors 17 and 18 may be provided.

Opposite the coils 17 and 18, across the aperture 9, there is provided the two-section inductor comprising sections 14 and 15, oriented substantially 90 degrees from their actual position, as shown in Figure 1, for the purpose of illustration in the circuit diagram. It should be understood, however, that the common axis of the detector or secondary coil 14—15 is transverse of the aperture, while the field generating or primary coils 17 and 18 are spaced along the operating axis of the aperture, from front to rear, in side-by-side relation, whereby the fields of the coils 17 and 18 are successively traversed by the material passed through the aperture. The longitudinal axes, however, of both the field generating and detecting coils are substantially parallel and extend transversely of the inspection aperture, and are shown in their operating relation in Figure 1.

With the foregoing arrangement the detector or secondary coil sections are inductively coupled to the primary coils. It will be seen that substantially balanced mutual coupling is obtained between the primary coil or inductor 17 and each of the sections 14 and 15 of the secondary or detector coil, as represented by the lines M2 and M4, respectively. Likewise, mutual coupling between the primary coil or inductor 18 and each of the sections 14 and 15 of the secondary or detector coil is represented by the lines M1 and M3, respectively. The inductors are shifted in operation until a minimum output voltage $V_0$ is applied to the detector and indicator apparatus 40 through output leads 41.

The mutual inductances M1 and M2, and likewise M3 and M4, are equal and opposite in sign to provide a relatively sharp null point of adjustment for the minimum output voltage $V_0$, and this arrangement includes providing substantially identical primary or field generating coils.

In actual practice, $V_0$ may have a relatively large finite value because of inherent dissymmetries in the circuits and inductors or coils, the physical orientation of one with respect to the other, and distortion of the field because of adjacent metallic objects such as circuit elements, wiring and shielding means.

Normal operating conditions require the amplitude I of the magnetizing current in the primary or field generating inductors 17 and 18 to be held substantially constant. The magnetizing current I in the primary coils is virtually independent of error current flow in the detector coil. Then, without introducing appreciable error, it can be assumed that the output signal voltage $V_0$ is impressed across an infinite impedance. Thus, one can write $j\omega I g_2 M$, and $j\omega I g_1 M$ as representing the error voltages induced in each of the sections of the secondary or detector inductors 14 and 15 respectively, where $M_1 - M_2 = g_1 M$, and $M_4 - M_3 = g_2 M$. The two sections 14 and 15 of the secondary inductors are made as nearly identical as possible, so that they have approximately the same error voltage pick-up and are placed so that a metal particle can effect only one coil section at a time, as will hereinafter be described.

Referring now to Figure 3, along with Figures 1 and 2, the physical relation of the inductance windings or coils of the detector system are more clearly shown with respect to X, Y and Z axes, the X axis being a center line extending along the axis of the detector or secondary coil 14, 15 and transversely of the inspection aperture; the Y axis extending at a right angle to the X axis and substantially parallel with the axis of the inspection aperture and through the intersection of the two sections of the coil 14, 15 in the same plane as the coil; and the Z axis being a vertical axis drawn through the intersection of the X and Y axes. Thus, in the present example, a plane passing through the X and Z axes is vertical, while a plane passing through the X and Y axes is horizontal. The coil arrangement in Figure 3 is diagrammatic and shows the orientation of the coils in operation as in Figure 1.

If the two-section detector or secondary coil 14—15 in Figure 3 occupied the same area in the form of a coil of one section, it could be considered that the error voltage output $V_0$, across the leads 41, could consist of the sum of two voltages, one being induced in one half of the coil and the other being induced in the other half of the coil. Now, when the same area is occupied by a coil as shown, with two halves connected in opposition by transposing the coil conductors from side to side at a cross-over point along the length of the coil, as shown at 45 and 46, between the sections, the error voltage output becomes the difference, rather than the sum, of the two voltages mentioned above. Thus all of the factors tending to produce an error voltage in the detector or secondary coil output, which are common to both halves 14—15 of the coil, are cancelled.

This not only applies to errors in symmetry and errors in field components caused by non-iniformity in the magnetizing or primary coil system, but also applies to the error signals produced by homogeneous material being inspected for the presence of metal contamination. The path of the material through the aperture is generally indicated by the dotted line 47. In the case of metal contamination in homogeneous material being inspected, it is desirable for approximately equal amounts of the material to pass under the two sections 14 and 15 of the detector or secondary coil for best cancellation and substantially zero output voltage. It should further be noted that this type of coil also tends to reduce the effect of spurious signals induced by stray fields from any exterior source, as hereinbefore mentioned.

Further in accordance with the invention, to reduce the effect of dimensional tolerances, vibration and temperature drift on the signal output, and furthermore to reduce the signal component produced by the electrical properties of the material being inspected, the cascade bridge system effectively consists of at least two bridges in which the error output signal of the first is the input signal to the second bridge. A cascade bridge arrangement of this type can be applied in general to mutual inductance bridge circuits. In the bridge system of Figures 1, 2 and 3, the two detector coil sections are made as nearly identical as possible and are placed so that a metal particle can affect only one coil at a time.

In addition to the foregoing assumptions of a constant magnetizing current I, and an infinite impedance across the detector coil, consider now the effect on the detector coil of the in-phase current difference and quadrature current difference error components of magnetizing current to be linear with small relative displacements between the primary coils and the secondary coils. This assumption holds over the small range employed in the balancing operation, as the voltage $V_0$ is a continuous function with displacement, and its derivative does not change in sign.

Assuming further that the two halves or sections of the detector inductor, with the lengths $b$ and $-b$ respectively, as shown in Figure 3, are identical, and that the voltage induced in the detector inductor is equal to the summation of voltages induced in a series of inductors with the same width but with infinitesimal length occupying the same area, in a conventional bridge:

$V_1=$ voltage induced in detector coil when the latter is displaced in the Y direction by an amount such that the change in mutual inductance $=\delta$.

$V_1=$ voltage induced in detector coil when the latter is displaced in the Y direction by an amount such that the change in mutual inductance $=\delta$.

$$V_1 = j\omega\left\{ (I+\Delta_1+j\Delta_2)\int_{-b}^{b}(M-\delta)dx - I\int_{-b}^{b}(M+\delta)dx \right\}$$
$$= j2b\omega\{(\Delta_1+j\Delta_2)(M-\delta) - 2\delta I\} \quad \text{(Equation 1)}$$

$V_2=$ voltage induced in detector coil when the latter is rotated about the Z axis a small amount so that the change in mutual inductance $=\frac{\delta x}{b}$.

$$V_2 = j\omega\bigg\{ (I+\Delta_1+j\Delta_2)$$
$$\int_{-b}^{b}\left(M-\frac{\delta x}{b}\right)dx - I\int_{-b}^{b}\left(M-\frac{\delta x}{b}\right)dx \bigg\}$$
$$= j2\omega Mb(\Delta_1+j\Delta_2) \quad \text{(Equation 2)}$$

In the cascade bridge, however, the two halves of the detector coil, with lengths $b$ and $-b$ respectively, are connected in opposition so that the total induced voltage is the difference of the voltages induced in the two halves.

$V'_1=$ voltage induced in detector coil when the latter is displaced in the Y direction by an amount such that changes in mutual inductance $=\delta$.

$$V'_1 = j\omega\bigg\{ (I+\Delta_1+j\Delta_2)\left[\int_{0}^{b}(M-\delta)dx - \int_{-b}^{0}(M-\delta)dx\right]$$
$$- I\left[\int_{0}^{b}(M+\delta)dx - \int_{-b}^{0}(M+\delta)dx\right]\bigg\} = 0$$
$$\quad \text{(Equation 3)}$$

$V'_2=$ voltage induced in detector coil when the latter is rotated about the Z axis a small amount so that changes in mutual inductance $=\frac{\delta x}{b}$.

$$V'_2 = j\omega\bigg\{ (I+\Delta_1+j\Delta_2)\bigg[\int_{0}^{b}\left(M-\frac{\delta x}{b}\right)dx -$$
$$\int_{-b}^{0}\left(M-\frac{\delta x}{b}\right)dx\bigg] - I\bigg[\int_{0}^{b}\left(M+\frac{\delta x}{b}\right)dx -$$
$$\int_{-b}^{0}\left(M+\frac{\delta x}{b}\right)dx\bigg]\bigg\}$$
$$= -j\omega\delta b[2I+\Delta_1+j\Delta_2] \quad \text{(Equation 4)}$$

From the foregoing considerations it will be seen that:

A perfect null in a conventional bridge is impossible, as indicated by either (1) or (2) of the above equations. However, with the cascade bridge, a null exists, as indicated by Equation 3, which is in accordance with actual performance, as it is independent of lateral dimension errors, temperature drift or vibration.

By Equations 3 and 4 it may be seen that with the cascade bridge, the induced error voltage is independent of the mutual inductance M, which is associated with dimensions in the vertical ZX plane; while the corresponding error voltage with the conventional bridge does depend upon M.

The maximum error with the conventional bridge occurs for a lateral displacement where the maximum error with the cascade bridge occurs for a diagonal (rotational) displacement, and the worst possible error with the conventional bridge is over twice as large as that with the cascade bridge.

Employing once again the assumptions used to obtain Equations 1 through 4, it follows by Figure 2, that:

$$V_0 = j\omega I(g_1-g_2)M = j\omega I\delta M \quad \text{(Equation 5)}$$

where $M_1-M_2=g_1M$, and $M_3-M_4=g_2M$, as stated hereinbefore.

The effect of material passing through the inspection aperture can be approximated by an incremental change in mutual inductance. If large products are passed through the center of the aperture, their effect on $g_1$ and $g_2$ is practically the same, and consequently $\delta$ is scarcely affected. However, a small metal particle can only effect one increment, $g_1$ or $g_2$, at a time, producing an appreciable change in $\delta$. The pronounced discontinuity of a large particle of metal would similarly produce a significant change in $\delta$ in entering the aperture.

In considering the cascade coil for a given installation, the statistical probability of two identical particles passing under corresponding sections of the two detector coil sections at the same time may be considered. The probability in most cases, of course, is low.

Since the product or material being inspected is normally relatively large compared with the metal contamination contained therein, the signal voltage output $V_0$ caused by the product itself may significantly be reduced by passing the said material through the center of the inspection aperture and substantially equally distributed under the detector coil sections.

The sensitivity of the system is increased by (1) decreasing the product signals as above mentioned, and (2) obtaining a lower residual error.

As hereinbefore noted, the error voltage output of the two-section cascade coil 14—15, shown in Figures 1, 2 and 3, is the difference between the error voltages induced in the two sections.

Where portions of these two sections are remote from each other, as in the case of a relatively wide inspection aperture, the error is less likely to be similar than in the regions which are close together. Therefore, the error may further be reduced by increasing the number of sections, for example, by making, in turn, a two-section cascade coil of each of the two former sections, resulting in four sections, as diagrammatically indicated in Figure 4, to which attention is now directed.

As in the two-section coil, the adjacent ones of the sections 45, 46, 47 and 48 of the four-section detector coil 49, are wound in opposite directions, and the entire coil preferably may comprise four equal sections with three transpositions or cross-over points at equal intervals along the length of the coil. The cross-over or transposition conductors at each cross-over point are indicated at 50 and 51. This type of coil or inductor is at present preferred, although as many as eight sections may be provided with good results. This type of coil, with multiple cascaded sections, is much less responsive to drift, vibration, interference from stray fields, and signals produced by the medium or material being inspected, than any conventional metal detector coil system. With reference to the number of cascade coil sections, however, there are certain limitations which must be considered.

Where the sections once removed are fairly remote, the main effect of mutual inductance is that between adjacent coils and increases the total effective inductance. If cascade coils are wound with various even numbers of sections, the total inductance will increase, as the number of sections are increased due to the mutual inductance between adjacent sections, to a maximum value. When the sections are increased beyond this number and the length is held constant, the inductance will decrease because the mutual inductance from sections once removed becomes significant. As the number of sections is further increased the mutual inductance of the coils once removed, three times removed, etc., further reduces the total inductance. It is rather obvious that if the number of sections were increased to a maximum number for a given coil length, a non-inductive coil would result. Therefore, it is advisable in the design of such a coil to employ the number of sections which will produce the greatest total inductance in order to obtain maximum sensitivity. Four to eight sections has been found to be satisfactory.

Another important consideration in the total number of sections is that the effective length of a given section, as presented to the conveyor or aperture width is determined by the standard width of a coil designed for that size aperture divided by the number of sections. This effective section length may be exceeded by the field distortion produced by a piece of metal contamination. In that case, the total signal will be the algebraic sum of the separate voltages induced in one or more sections and may be insufficient to be detected. It has been found that for a given section of a cascade coil the field is sufficiently localized to give a normal output free of cancellation effects when the particle of metal passes near the coil and as the distance from the coil increases, the field distortion effectively spreads out to include other sections.

Because of these variations in field distortion, the number of possible sections is limited by height and width of the aperture. Thus if a large number of sections is required and at the same time the height must be great in order to provide a specified clearance, the width of the aperture must be extended to the point that the length of each section permits acceptance of the effective field distortion produced by the type of metal particles required to be detected passing through the aperture, at maximum distance from the cascade coil or approximately the height of the aperture.

In order to prevent dead spots, it is necessary to design the junction of adjacent sections so that the field distortion cannot appear equally in two sections at the same time as a particle passes through the aperture on a conveyor. It will be noted that the transposition of the coil conductors from side to side of the detector coil or inductor is made at an angle other than 90 degrees with respect to the longitudinal axis X—X of the coil. Preferably this angle is substantially 45 degrees and the end conductors 53 and 54 are likewise placed at the same angle, as shown in Figure 4, providing a series of parallelogram-shaped coil sections along the X axis. The end conductor 54 is interrupted to provide connections for operating current input leads 55 corresponding to the input leads 41 of the coil 14—15 of Figure 3. The configuration of the end conductors therefore is substantially the same as the cross-over conductors at the transposition points along the coil.

The width of the coil or inductor, indicated at $d$, may be of the order of three inches in certain metal detector structures and the length of one side of the coil, $c$, may be of the order of twenty-five inches, for example. The overlap length $d$ with a cross-over angle of 45 degrees and with a coil of three inches width will likewise be three inches, making a total of twenty-eight inches in the over all length for the coil referred to. The length of each section is therefore $c/4+d$ in the coil referred to. This provides the desired overlap of one coil section with respect to each other adjacent coil section so that as material to be inspected moves through the inspection aperture 9 of the detector apparatus and passes the detector coil in a direction substantially at a right angle to the axis X—X, that is, in a direction normal to the longest dimension of the coil, it is substantially impossible for a particle of metal to affect two sections of the coil equally, and therefore any danger of a metal particle traversing a null point is precluded.

While other types of coil cross-over or transposition means may be provided, the simple transverse cross-over connection shown throughout Figures 2, 3 and 4 is at present preferred, since it involves merely placing the conductors in slots in the form, the slot being common to cross-over conductors extending in both directions.

In the approximation which considers only the mutual coupling between adjacent sections, the total inductance, L, for a cascade coil of the type shown in Figures 2, 3 and 4, may be expressed by the following equation.

$$L = L_0 + 2(n-1)M$$

where:

$n$ = number of sections in cascade coil
$L_0$ = inductance where conventional coil is wound on cascade form; i. e. value of L determined where $n=1$
$M$ = mutual inductance between any two adjacent sections
$L$ = effective inductance of cascade coil $$k = \frac{nM}{L_0} = \text{coefficient of coupling between adjacent sections}$$

It should also be noted that when the cascade coil sections are placed at an angle as shown, that is, in the form of non-rectangular parallelograms, so that the end conductors are at other than a right angle with respect to the axis of the coil, the balancing of the metal detector is facilitated since the coil sections 17—18 are much easier to position with respect to the primary or generator coils in order to attain the desired initial null or zero output for the detector voltage $V_0$.

It will be noted that the cascade coil system of Figure 4 comprises four coil sections or elements, all of which are serially connected. In this manner the error voltage output of each two-section cascade coil element is the difference between the error voltages induced in the two sections, and likewise the error voltage output of the two-section units of the coil is the difference between the error voltages induced in the two units, so that the overall voltage is the difference rather than the sum of the various error voltages in the coil sections 45–48 inclusive.

The series connection for the successive coil sections is, however, made by transposing the conductors rather than by winding individual coils and connecting them in series. The advantages of this arrangement are such that a much stronger field may be employed in the detector apparatus while maintaining a desired initial balance, the inspection aperture may be reduced to a relatively small size with a relatively strong field, while at the same time the initial adjustment for a desired null or zero voltage output is readily attained, and the apparatus furthermore is very stable in operation and the initial adjustment is not appreciably disturbed by minor vibrations, slight movement of parts or aging of materials in use.

Finally, it should be noted that the transposition of the conductors is made with respect to the center line or X axis of the detector coil and that the cross-over or transposition is uniform and equal on opposite sides thereof. With this arrangement, the length of conductor exposed to the field on one side of the center line is the same as the length of conductor exposed to the field on the opposite side and the entire structure comprises a series of non-rectangular parallelograms composed of transposed substantially parallel conductors effectively providing a series of inductance elements extending along the axis and serially connected.

The cascade bridge system of the present invention provides a metal detection apparatus which may have a relatively high degree of sensitivity arising from the fact that two or more sections of the cascade inductor are wound in opposite directions by transposition of the conductors, so that in a uniform A.-C. field the voltage induced in one of the sections tends to cancel the voltage induced in the other section.

Prior limits for the sensitivity of metal detection apparatus of the character described without the cascade system of detection are indicated by the fact that with an inspection aperture of substantially twenty-five inches in width the minimum height to be used was of the order of four inches and permitted the detection of metal particles at least as small as a steel sphere $5/64$ of an inch in diameter.

With the cascade system of the present invention for the same aperture width a height of two inches could be attained, thereby giving a relatively strong field with the result that a metal particle at least as small as a steel sphere $3/64$ of an inch could be detected. The relative mass of the smaller diameter metal body with respect to the first is an indication of the improvement attained. This invention, therefore, is effective to set new limits of sensitivity for metal detection apparatus of the electromagnetic type.

The main advantages are as follows: (1) the cascade system tends to be self-balancing so that when adjusted for a null position, or zero output, in the field of the detection apparatus, the residual voltage is reduced to substantially a minimum low value. (2) The self-cancelling feature makes dimensional tolerance variations of the inspection head and other portions of the apparatus constituting the inspection aperture, of far less importance than in known inspection apparatus of this type. (3) The initial adjustment is unaffected by any disturbances that affect both halves of the secondary coil or inductor equally, such disturbances being temperature drift, vibration, and external fields. (4) In many cases the product being inspected has an effect on a metal inspection apparatus particularly if the material is semi-conducting. Accordingly, the apparatus of the present invention is arranged so that the material being inspected passes equally under each half of the secondary coil or inductor and the signal voltage from the material is thereby reduced by a very large factor and permits the inspection of some materials which would otherwise be impossible to inspect with a metal detector of the electromagnetic type.

I claim as my invention:

1. In a metal detector having an alternating electro-magnetic inspection field, secondary coil means oriented for detecting metal in said field and comprising an elongated inductance coil having substantially parallel conductors transposed alternately from side to side of said coil across the longitudinal axis thereof at points substantially at equal intervals along the length thereof, said conductors at said transposition points lying at angles other than a right angle to said longitudinal coil axis, whereby a series of cascade-bridge coil sections are provided in said inductance coil and effectively connected in series opposed balanced relation.

2. In a metal detector apparatus, the combination as defined in claim 1, wherein said elongated inductance coil comprises an even number of coil sections in continuous overlapping relation with respect to the flow of material through said detector and said field.

3. A detector coil for a metal detector of the electromagnetic type, comprising a series of coil sections extending along a common longitudinal axis, the conductors of said coil sections being transposed from side to side of said coil between said sections along the length of said coil substantially at equal intervals and equally on opposite sides of said common longitudinal axis to provide therein a series of balanced parallelogram areas along and on opposite sides of said axis, said conductors being further transposed at angles to said axis other than a right angle, whereby said areas are substantially adjacent non-rectangular parallelograms and said sections are connected effectively in balanced series opposition to provide a differential voltage output.

4. A detector coil for a metal detector of the electromagnetic type, comprising a series of coil sections extending along a common longitudinal axis and substantially in a common plane, the conductors of said coil sections being transposed from side to side of said coil between said sections along the length of said coil substantially at equal intervals and equally on opposite sides of said common longitudinal axis, thereby to provide a series of substantially equal coil field areas along and on opposite sides of said axis, said conductors being further transposed at angles to said axis other than a right angle whereby said sections provide a series of substantially adjacent non-rectangular parallelograms and equal opposed polarity areas on opposite sides of said axis, and means providing an electrical output connection therewith for said coil sections in series opposition, thereby to derive a resultant differential voltage therefrom.

5. Metal detection apparatus comprising in combination, means providing an inspection aperture for the passage of materials to be inspected, inductive coil means providing an electromagnetic field across the width of said aperture along one boundary thereof, a cascade-bridge-connected signal pickup inductor extending along the opposite boundary of said aperture in spaced relation to said first named coil means having output leads for deriving a differential signal voltage therefrom, and signal indicator means connected with said output leads, said signal pickup inductor having an even number of sections connected in series opposition and having conductors transposed from side to side at uniform intervals along the length thereof between said sections.

6. Metal detection apparatus having a metal detection aperture, comprising a pair of inductors extending transversely of said aperture along one boundary thereof and being connected in opposition to provide a composite electromagnetic field in said aperture, a second inductor extending transversely of said aperture along the opposite boundary thereof in spaced parallel relation to said first named inductors, said second inductor having a plurality of substantially equal coil sections along the axial length thereof in the plane of the coil each including transposed conductor elements at uniform intervals, whereby a series of cascade connected coil elements is provided as an indicator voltage source.

7. Metal detection apparatus as defined by claim 6, wherein the transposition of the several coil conductor elements with respect to a common axial center line in the plane of the coil for the coil sections is uniform and equal on opposite sides thereof to provide uniform and substantially equal included areas in at least two coil sections and in corresponding portions of any two like coil sections.

8. Metal detection apparatus as defined by claim 6, wherein the second inductor coil sections provide a series of non-rectangular parallelograms with the transposed conductors substantially uniformly spaced along the length of the second inductor, and wherein the series of inductor sections are effectively connected in opposition, whereby response to external disturbances and the electrical properties of material for inspection is reduced to a minimum.

9. In metal detection apparatus having an inspection aperture through which material to be inspected may be passed, the combination of a pair of primary coils extending in substantially parallel relation to each other along one boundary of said aperture from side to side thereof transversely, said coils being connected in opposition electromagnetically, means for applying an alternating current thereto, a secondary coil extending along the opposite boundary of said aperture in substantially parallel relation to said first named coils providing a source of voltage for indicating the presence of metal in material under inspection, said secondary coil being inductively coupled substantially equally with each of said primary coils across said aperture and comprising conductors transposed from side to side of said coil across an axis thereof in the plane of said coil at substantially equal intervals along the length of said coil and at angles other than a right angle to said axis, whereby a series of cascade-bridge coil sections are provided in series relation, and means responsive to the differential voltage output of said secondary coil sections connected therewith to provide an indication of a predetermined metal content for material passing through said aperture.

10. In metal detection apparatus, the combination as defined in claim 9, wherein the secondary coil comprises an even number of coil sections in continuous overlapping relation with respect to the flow of material through the aperture and to the field established by said primary coils, and said coil further lying in a plane substantially parallel with the plane of movement of material passing through said aperture.

11. Metal detection apparatus comprising in combination, means providing an inspection zone through which material to be inspected may be passed, primary coil means rigidly mounted in proximity to said zone, means providing electrical connections with said primary coil means for applying alternating current thereto to establish an alternating magnetic field in said inspection zone, secondary coil means rigidly mounted in inductive coupling relation to said first named coil means and in proximity to said zone, said secondary coil means oriented for detecting metal in said field and comprising an elongated inductance coil having substantially parallel conductors transposed alternately from side to side of said coil across the longitudinal axis thereof at points substantially at equal intervals along the length thereof, said conductors at said transposition points lying at an angle other than a right angle to said longitudinal coil axis, whereby a series of cascade-bridge coil sections are provided in said inductance coil and connected in series relation, and means connected with said coil responsive to the differential voltage output of said coil sections, to provide an indication of a predetermined metal content for material passing through said zone.

12. In a metal detection apparatus, the combination as defined in claim 11, wherein said elongated inductance coil comprises an even number of coil sections in continuous overlapping relation with respect to the flow of material through the inspection zone and to the field established by said primary coil means.

13. In metal detection apparatus of the electromagnetic type having an inspection zone, means for establishing therein a composite electromagnetic field comprising two magnetic fields of opposite polarity in substantially parallel extended close relation to each other, a detector coil mounted in balanced inductive relation to said composite field and extending along the length thereof in opposed relation thereto across said inspection zone, said detector coil having a series of sections providing substantially equal areas of alternate opposite polarity along the axis of the coil and each section having areas of opposite polarity on opposite sides of the longitudinal axis of the coil, said coil having output terminal means, and transposition conductor elements between said coil sections connecting said coil sections successively in series opposition between said output terminal means.

BEN R. GOSSICK.

REFERENCES CITED

The following references are of record in the file of this patent:

UNITED STATES PATENTS

| Number | Name | Date |
| --- | --- | --- |
| 1,367,734 | Curtis | Feb. 8, 1921 |
| 1,648,388 | Joy | Nov. 8, 1927 |
| 2,124,579 | Knerr et al. | July 26, 1938 |
| 2,237,254 | Broekhuysen | Apr. 1, 1941 |
| 2,337,352 | Sitterson et al. | Dec. 21, 1943 |
| 2,338,793 | Zuschlag | Jan. 11, 1944 |